(12) United States Patent
Brodersen et al.

(10) Patent No.: US 8,204,977 B1
(45) Date of Patent: Jun. 19, 2012

(54) CONTENT ACCESS ANALYTICS

(75) Inventors: Anders Torp Brodersen, Wadenswil (CH); Theodore Kent Hamilton, Küsnacht (CH); Mirjam Wattenhofer, Gockhausen (CH)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/291,898

(22) Filed: Nov. 8, 2011

(51) Int. Cl.
*G06F 15/173* (2006.01)
(52) U.S. Cl. .................................... 709/223; 709/224
(58) Field of Classification Search .................. 709/203, 709/217–219, 224–226, 231
See application file for complete search history.

(56) References Cited

U.S. PATENT DOCUMENTS

| | | | | |
|---|---|---|---|---|
| 4,734,858 A * | 3/1988 | Schlafly | | 705/26.35 |
| 5,870,559 A | 2/1999 | Leshem et al. | | |
| 6,725,275 B2 * | 4/2004 | Eyal | | 709/231 |
| 7,353,270 B2 | 4/2008 | Kumar et al. | | |
| 7,502,836 B1 * | 3/2009 | Menditto et al. | | 709/217 |
| 7,953,725 B2 * | 5/2011 | Burris et al. | | 707/710 |
| 8,010,657 B2 | 8/2011 | Hall et al. | | |
| 8,069,182 B2 * | 11/2011 | Pieper | | 707/769 |
| 2002/0070953 A1 | 6/2002 | Barg et al. | | |
| 2003/0069803 A1 * | 4/2003 | Pollitt | | 705/26 |
| 2003/0225761 A1 | 12/2003 | Wagener et al. | | |
| 2005/0108724 A1 | 5/2005 | Sterling et al. | | |
| 2007/0250468 A1 * | 10/2007 | Pieper | | 707/1 |
| 2008/0126354 A1 | 5/2008 | Wang et al. | | |
| 2008/0313040 A1 * | 12/2008 | Rose et al. | | 705/14 |
| 2009/0234876 A1 | 9/2009 | Schigel et al. | | |
| 2010/0299336 A1 * | 11/2010 | Bergstraesser et al. | | 707/759 |
| 2010/0318611 A1 | 12/2010 | Curtin et al. | | |
| 2010/0332404 A1 | 12/2010 | Valin | | |
| 2011/0173076 A1 | 7/2011 | Eggleston et al. | | |
| 2011/0185023 A1 | 7/2011 | Jin et al. | | |
| 2011/0238767 A1 * | 9/2011 | Murphy | | 709/206 |
| 2011/0252160 A1 * | 10/2011 | Wu | | 709/246 |

OTHER PUBLICATIONS

Di Ma; Hongxia Jin, "Content usage tracking in superdistribution," Consumer Communications and Networking Conference (CCNC), 2011 IEEE , vol., No., pp. 912-917, Jan. 9-12, 2011, 6 pages.

Justin Cutroni, "Tracking YouTube Videos with Google Analytics" <http://cutroni.com/blog/2008/07/29/tracking-youttube-videos-with-google-analytics/>, 21 pages, Jul. 29, 2008.

Jonathan Weber, Tracking YouTube Videos in Google Analytics <http://www.lunametrics.com/blog/2010/11118/tracking-youtube-videos-google-analytics/>, 3 pages, Nov. 18 , 2010.

"How to track embedded YouTube videos with Google Analytics" <http://code.google.com/p/ga-youtube-tracker/wiki/HowToTrackEmbeddedYoutubeWithGoogleAnalytics>, 2 pages.

(Continued)

*Primary Examiner* — Minh-Chau Nguyen
(74) *Attorney, Agent, or Firm* — Turocy & Watson, LLP

(57) ABSTRACT

Systems and methods for media access analytics are disclosed herein. When media content such as a video is accessed, typically by a referring link, the referrer can be identified. The referrer can be classified as an internal referrer, an external referrer, a viral referrer, or into another of a set of predefined classes. Statistics associated with access to the media content can be generated according to an associated class of referrer and presented to a user associated with the media content (e.g., a user who uploaded the video) or another authorized party.

23 Claims, 14 Drawing Sheets

OTHER PUBLICATIONS

"Visible Measures—About Us" <http://corp.visiblemeasures.com/about-us>, 3 pages.

"Tube Mogul—Campaign Reporting That Will Blow Your Mind" <http://www.tubemogul.conn/solutions/playtime/reporting>, 5 pages.

"Tracking Youtube Videos With Google Analytics" <http://webanalyticstips.blogspot.conn/2011/03/tracking-youtubevideos-with-google.html>, 5 pages, Mar., 2011.

"Tracking Youtube Videos With Google Analytics" <http://darincass.com/tracking-youtube-videos-with-google-analytics/>, 4 pages.

\* cited by examiner

CONTENT ACCESS ANALYTICS

TECHNICAL FIELD

This application generally relates to content access analytics, and more particularly to tracking, storing, organizing, and presenting information associated with media content referrers.

BACKGROUND

When a user uploads a video or other media content to a video hosting site, the user is often interested in access statistics indicating how many times other users watched his or her video. Some existing systems can provide information relating to a total number of views or similar data, but these systems often provide too little information or overwhelm the user with information that is difficult for the user to decipher and/or information that is not particularly relevant to the interests of the user.

SUMMARY

The following presents a simplified summary of the specification in order to provide a basic understanding of some aspects of the specification. This summary is not an extensive overview of the specification. It is intended to neither identify key or critical elements of the specification nor delineate the scope of any particular embodiments of the specification, or any scope of the claims. Its purpose is to present some concepts of the specification in a simplified form as a prelude to the more detailed description that is presented in this disclosure.

Systems and methods disclosed herein relate to content access or consumption analytics. An identification component can be configured to identify a referrer of media content (e.g., a video uploaded to a content hosting domain or web site). A classification component can be configured to classify the referrer into one of a set of predefined classes, wherein the set of predefined classes includes: (1) an internal referrer class, (2) an external referrer class, and (3) a viral referrer class. A statistics component can be configured to generate statistics associated with access to the media content for at least one class included in the set of predefined classes.

The following description and the drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

BRIEF DESCRIPTION OF THE DRAWINGS

Numerous aspects, embodiments, objects and advantages of the present invention will be apparent upon consideration of the following detailed description, taken in conjunction with the accompanying drawings, in which like reference characters refer to like parts throughout, and in which.

DETAILED DESCRIPTION

Overview

Figure 1:
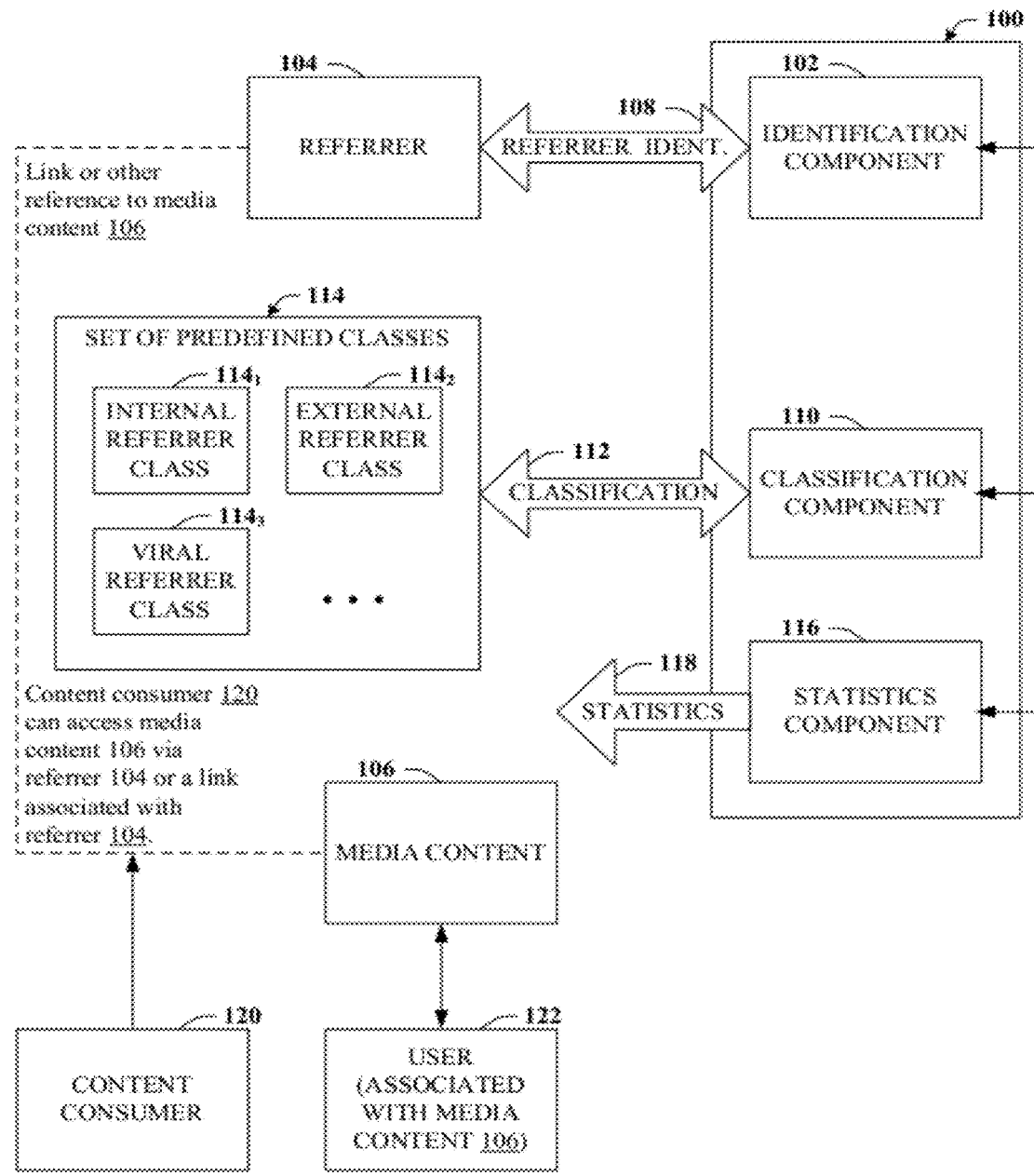
FIG. 1 illustrates a high-level functional block diagram of an example content access analytics system in accordance with an implementation of this disclosure.

Various aspects or features of this disclosure are described with reference to the drawings, wherein like reference numerals are used to refer to like elements throughout. In this specification, numerous specific details are set forth in order to provide a thorough understanding of this disclosure. It should be understood, however, that certain aspects of disclosure may be practiced without these specific details, or with other methods, components, materials, etc. In other instances, well-known structures and devices are shown in block diagram form to facilitate describing the subject disclosure.

Systems and methods disclosed herein relate to detailed content access analytics and presentation thereof. For example, consider a scenario in which a content consumer is displaying a web page that includes a link to a video (e.g., uploaded to a content hosting site by a user associated with the video). When the content consumer clicks on the link, information can be logged (e.g., by the content hosting site) identifying the web page as a referrer of a view of the video. As a result, the user who uploaded the video to the content hosting site (or another authorized party) can be presented with information relating to this particular access to his or her video.

Such information can be very useful to the user, but large amounts of aggregated statistics can become confusing to the user. Implementations of the subject matter disclosed herein can logically organize referrer information into meaningful categories or classes and can provide such information according to logically organized views in a manner that is more robust, convenient, relevant, and/or simple for the user.

For example, referrers can be divided according to a set of predefined classes. Thus, a particular referrer can be categorized into an internal referrer class, an external referrer class, a viral referrer class, or another class included in the set of predefined classes. Referrers categorized as internal referrer classes can be those referrers that link to the media content from within the hosting site domain, such as from domain-centric advertising, annotations, search results, etc. Referrers categorized as external referrer classes can be those referrers that link to the media content from outside the hosting site domain such as an external search results page or another external uniform resource locator (URL). Referrers categorized as viral referrer classes can be those referrers for which certain reference information is not available or provided such as from embedded content players or from direct or mobile views.

To provide an introductory example, consider a video of a user's kitten displayed and/or accessed once by a content consumer who searched the hosting site domain with the search string: "cute kitten". Further, the video is displayed twice by content consumers who searched an external search engine for "cute kitten", 10 times by content consumers who viewed the video through an embedded object on a "cute-kitten-videos" web site, and 100 times by content consumers who are subscribers to a channel of the user and/or video. In this example, the above data can be characterized as follows:
Hosting site domain search: 1→internal referrer class
Subscriber: 100→internal referrer class
External search: 2→external referrer class
Viral-embedded: 10→viral referrer class The user who uploaded the video can request various video analytics/statistics for his or her kitten video. In response, a presentation of the statistics can be provided to the user such that the user can recognize at a glance that the internal referrer class is the most important with respect to discovering the video. Further, the user can drill down into the internal referrer class (or any other class) to discover that subscribers to his or her channel are the primary source of traffic.

Example Content Consumption Analytics

Referring now to FIG. 1 content consumption analytics system 100 in accordance with an implementation of this disclosure is depicted. System 100 can include a memory that stores computer executable components and a processor that executes computer executable components stored in the memory, an example of which can be found with reference to FIG. 10. In addition, system 100 can include identification component 102 that can be configured to identify referrer 104 of media content 106. In one or more embodiments, media content 106 can be a video uploaded (e.g., by user 122) to a content domain such as a third party video content domain (e.g., a video hosting website that is not owned, managed, or operated by user 122). Referrer 104 can be or can relate to a source or location of a reference link (e.g., a uniform resource locator (URL)) utilized to access media content 106.

Identification of referrer 104 is illustrated by referrer identification 108. For example, consider a web page that includes a link or other reference or object that accesses media content 106. When the link is employed to access media content 104 (e.g., by content consumer 120), identification component 102 can identify the web page as referrer 104. Such can be accomplished by examining message headers or other suitable data or metadata, typically included in a request for access to media content 106.

System 100 can further include classification component 110 that can be configured to classify referrer 104 into one of a set of predefined classes 114. Set of predefined classes 114 can include substantially any number of member classes, three of which are illustrated as non-limiting examples: internal referrer class $114_1$, external referrer class $114_2$, and viral referrer class $114_3$, which are further detailed infra. In this example, once identification component 102 identifies referrer 104 (e.g., via referrer identification 108) classification component 110 can classify (e.g., via classification 112) referrer 104 as one or more of internal referrer class $114_1$, external referrer class $114_2$, and viral referrer class $114_3$, or another class extant in set of predefined classes 114. Additional detail relating to referrer identification 108 and classification 112 is provided in connection with FIG. 2.

System 100 can also include statistics component 116 that can be configured to generate statistics 118 associated with access to media content 106. Statistics 118 can be generated for at least one class included in set of predefined classes 114, and in an exemplary implementation is constructed on a per-class basis. For example, access statistics can be tracked for each class (e.g., $114_1$, $114_2$, $114_3$, etc.) or for a subset of classes.

Figure 2:
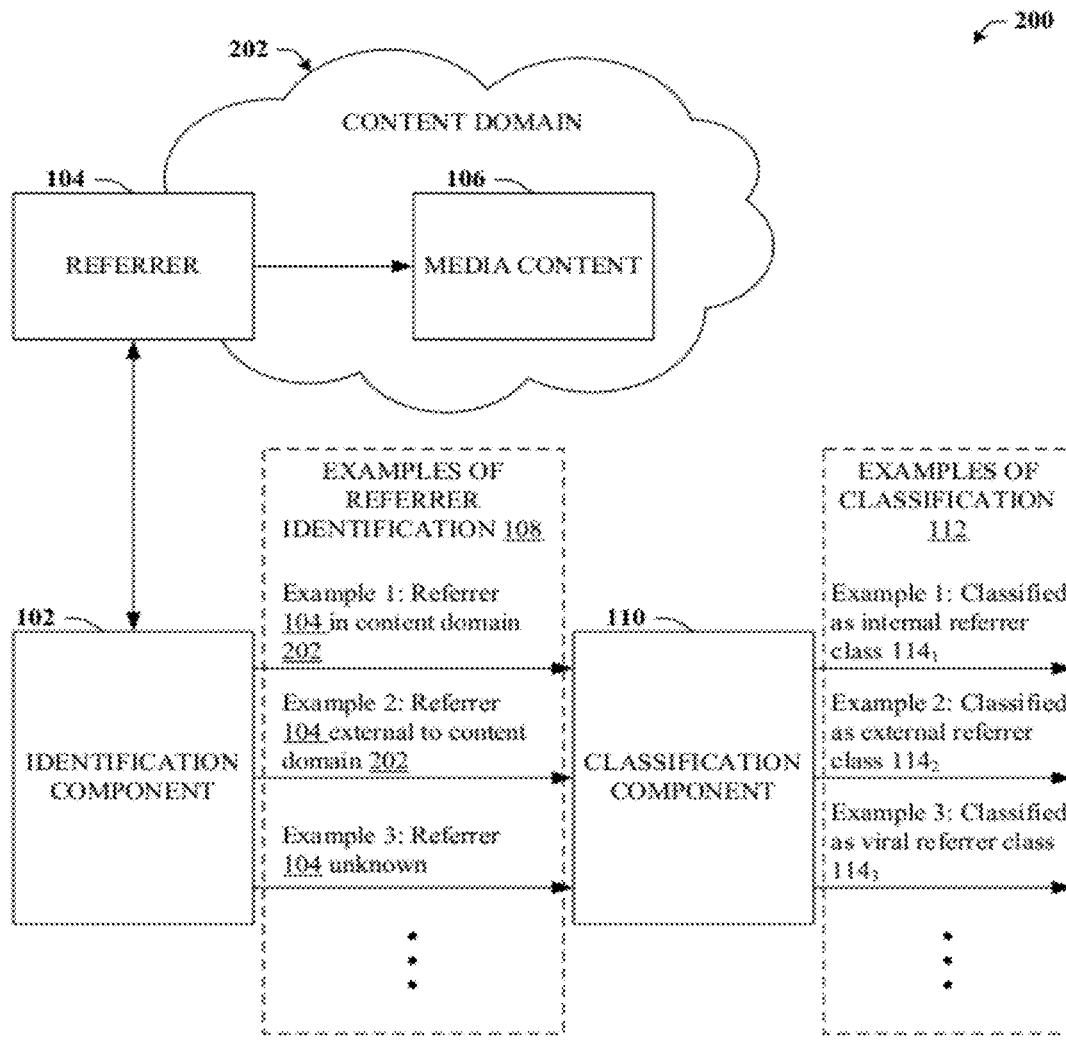
FIG. 2 depicts a functional block diagram of an example system that illustrates various examples of referrer identification and classification in accordance with an implementation of this disclosure.

Referring now to FIG. 2, system 200 is illustrated. System 200 illustrates several non-limiting examples of referrer identification 108 and associated classification 112. System 200 depicts media content 106 that is included in content domain 202, which can be, e.g., a video hosting web site. In some cases referrer 104 can reside in content domain 202, while in other cases referrer 104 can be outside of content domain 202.

In any case, when referrer 104 is utilized to access media content 106, identification component 102 can perform referrer identification 108 and classification component 110 can perform classification 112. In example 1, referrer 104 is in content domain 202. For instance, referrer 104 can be associated with one or more of content domain advertising (e.g., a reference link to media content 106 extant in an ad hosted by content domain 202), a content domain annotation (e.g., a reference link to media content 106 extant in a user comment or another annotation hosted by content domain 202), a content domain channel (e.g., a reference link to media content 106 extant in a content channel hosted by content domain 202), a content domain promotion (e.g., a reference link to media content 106 extant in promotion hosted by content domain 202), a content domain subscription (e.g., a reference link to media content 106 extant in subscription content hosted by content domain 202), a content domain search (e.g., a reference link to media content 106 extant in content domain 202 search engine results), and so forth. In example 1, classification component 110 can classify referrer 104 into internal referrer class $114_1$ in response to referrer 104 being in content domain 202 that is associated with media content 106.

In example 2, referrer 104 is in an external domain or otherwise not included in content domain 202. For example, referrer 104 can be associated with an external web site, web address, or URL such as a user web page or blog that includes a reference link to media content 106 or a search results page that includes a reference link to media content 106. In example 2, classification component 110 can classify referrer 104 into external referrer class $114_2$ in response to referrer 104 being external to content domain 202 that is associated with media content 106.

In example 3 certain information associated access to media content 106 is unknown. For instance, when referrer 104 is associated with an embedded content presenter (e.g., a content player embedded in and/or accessible from a website or social networking application) or associated with a mobile access, then the source of referrer might be unknown. In this case, classification component 110 can classify referrer 104 into viral referrer class $114_3$ in response to referrer 104 being unknown. It is understood that additional or alternative classes can exist in set of predefined classes 114, and such classes can include subclasses, which is further described with reference to FIG. 3.

Figure 3:
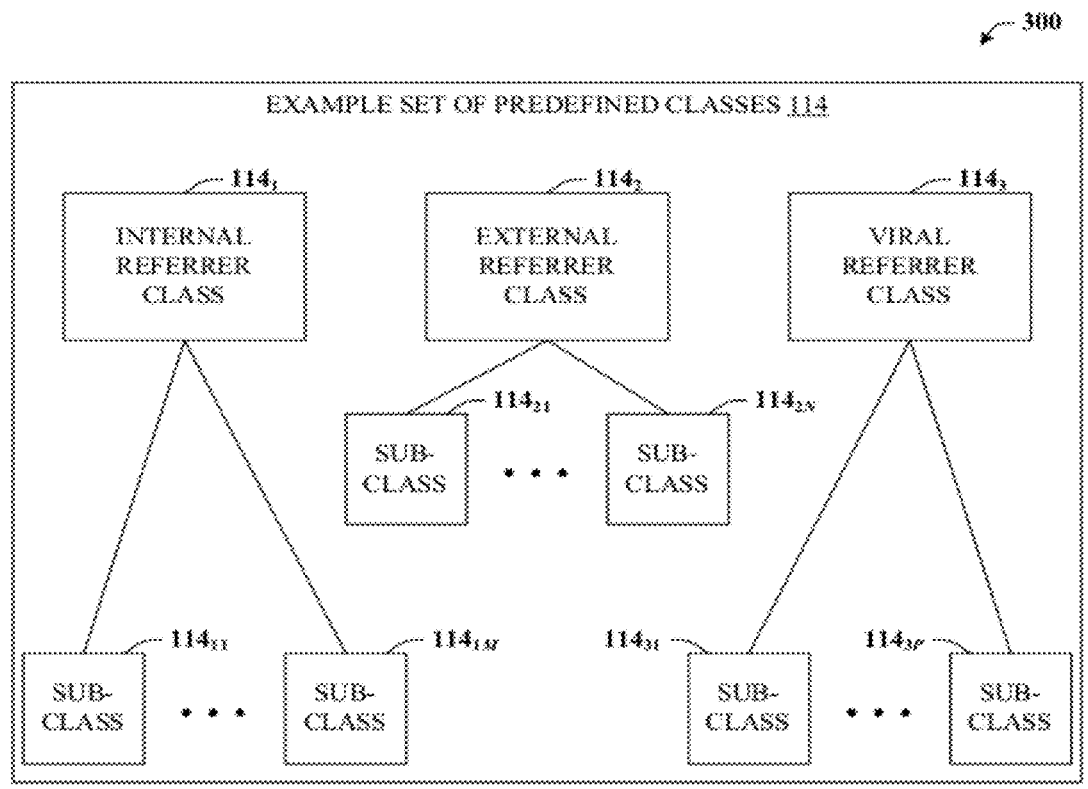
FIG. 3 illustrates an example hierarchical view of predefined classes in accordance with an implementation of this disclosure.

Turning now to FIG. 3, hierarchical view 300 is depicted. Hierarchical view 300 illustrates various example members of set of predefined classes 114 with respective example subclasses that can further distinguish accesses to media content 106. Internal referrer class $114_1$ can include one or more subclass(es), denoted $114_{11}$-$114_{1M}$, where M can be substantially any positive integer. For example, subclasses $114_{11}$-$114_{1M}$ can relate to specific types of internal referrers and/or specific internal sources of a reference link to media content 106, such as an internal advertiser, an internal annotation, an internal channel, an internal promotion, an internal subscription, an internal domain search result, etc.

External referrer class $114_2$ can include one or more subclass(es), denoted $114_{21}$-$114_{2N}$. Subclasses $114_{21}$-$114_{2N}$ can relate to specific types of external referrers and/or specific external sources of a reference link to media content 106, such as an external blog, an external web page or web site, an external search results page, and so forth. For example, one subclass of the external referrer class can relate to origination from a specific domain, e.g., origination from a particular social networking web site. Another subclass can relate to origination from a type of domain, e.g., origination from websites categorized as social networking sites or origination from websites categorized as news sites. Viral referrer class $114_3$ can include subclass(es) $114_{31}$-$114_{3P}$, which can relate to specific types of unknown or viral referrers and/or specific unknown or viral sources of a reference link to media content 106, such as an embedded content player/presenter, a mobile access, or the like. It is understood N and P can be substantially any positive integer. It is also understood that in one implementation a subclass may be categorized as a subclass of different class than in another implementation. For example, a subclass relating to origination from feeds within a social networking application may be categorized as part of the external referrer class in one implementation and as part of the viral referrer class in another implementation.

Referring back to FIG. 1, it is understood that statistics component 116 can generate statistics 118 regarding number of accesses of media content 106 relating to a particular class (e.g., $114_1$, $114_2$, $114_3$ ...) from set of predefined classes 114. In one or more embodiment, statistics component 116 can generate statistics 118 regarding number of accesses of media content 106 relating to a subclass (e.g., one or more of $114_{11}$-$114_{1M}$, $114_{21}$-$114_{2N}$, $114_{31}$-$114_{3P}$ ...) of the particular class. Hence, statistics 118 can provide acute detail for a user associated with media content 106 or another authorize party in a manageable way that is less likely to confuse or overwhelm the user. Further, the user can drill down to review access data for classes or categories of particular interest without the distraction of similar information that is less useful at a given time, which is further detailed in connection to FIG. 4.

Figure 4:
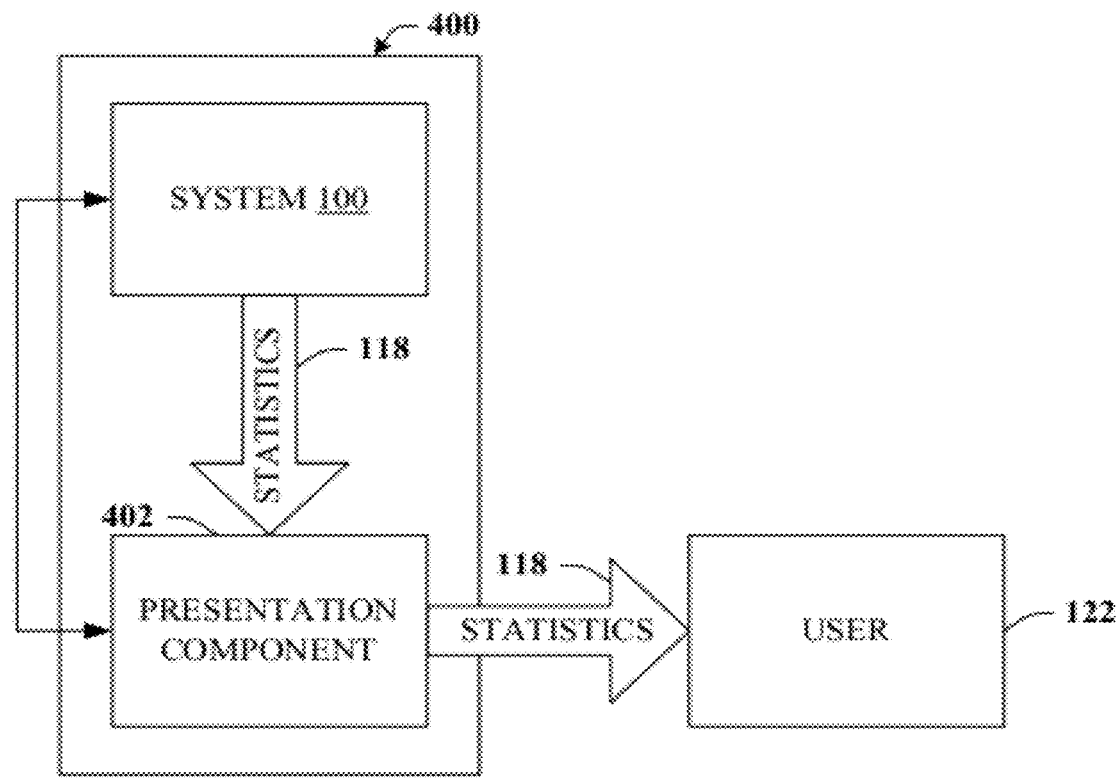
FIG. 4 illustrates a functional block diagram of an example catalog content access analytics and presentation system in accordance with an implementation of this disclosure.

Turning now to FIG. 4, system 400 is depicted. System 400 can include all or a portion of system 100 detailed in connection with FIG. 1. System 400 can also include presentation component 402 that can be configured to present statistics 118 to user 122 or another authorized entity. In one or more embodiment, system 400 can be included in content domain 202 (e.g., a video web site that hosts media content 106) and can reside on one or more servers associated with content domain 202. In this embodiment, presentation component 402 can transmit all or a portion of statistics 118 over a communications network (e.g., the Internet) to user 122 and/or a display or presentation device or application associated with user 122. In one or more embodiment, presentation component 402 can present multiple views of statistics 118, examples of which can be found with reference to FIGS. 5A-5D.

Figure 5A:
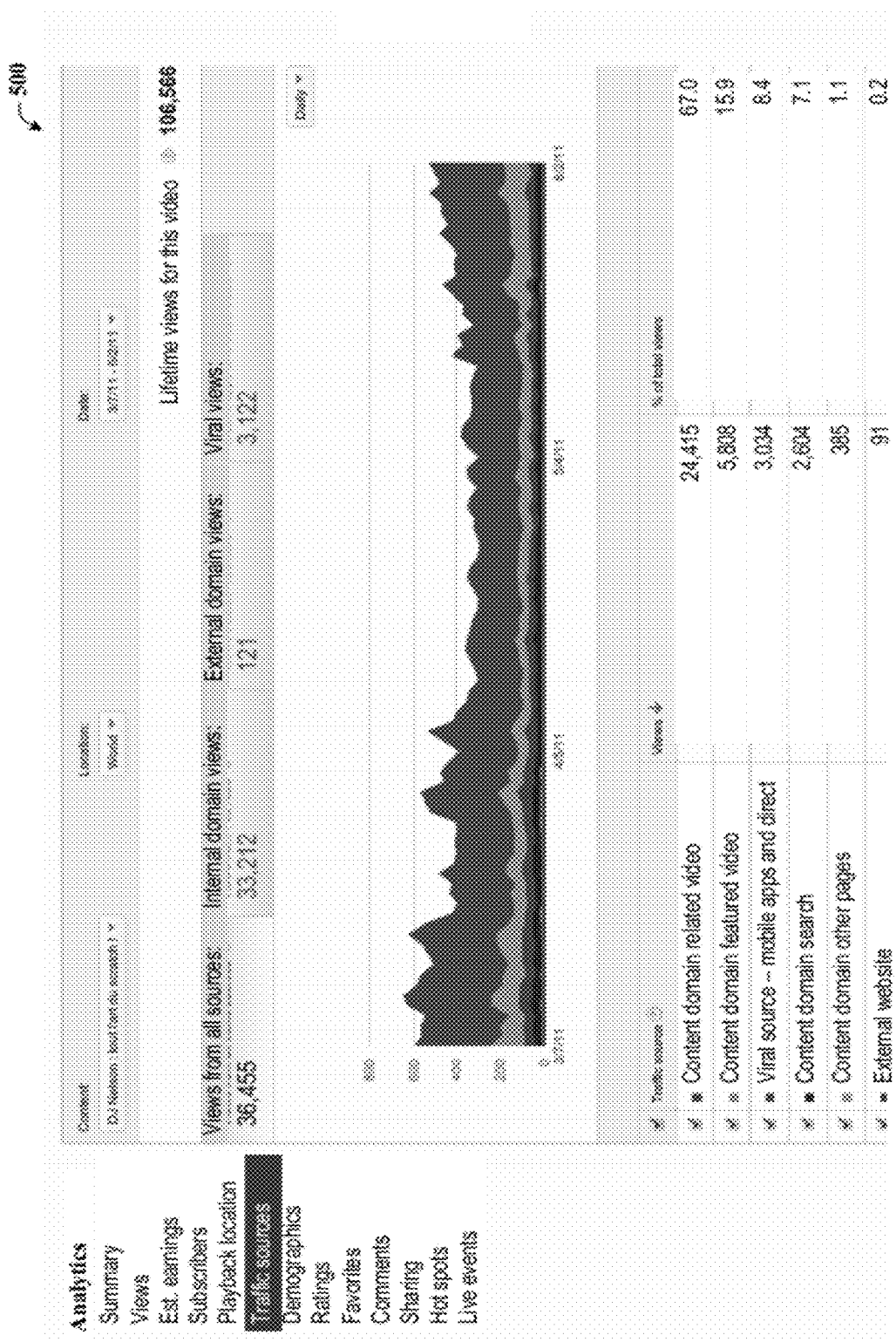
FIGS. 5A-D illustrate multiple example presentations or views of the access statistics in accordance with an implementation of this disclosure.

FIG. 5A depicts example presentation 500. Example presentation 500 illustrates an aggregate view of statistics 118. By way of illustration, consider an example scenario in which media content 106 is an instructional video that has been uploaded to content domain 202 by the user (e.g., user 122) in which the user explains how to identify poison ivy. Over time, the user might be interested in observing various information relating to accesses to the video. As can be seen in example presentation 500, the "Lifetime views for this video" are at 106,566. In this example case, the "Views from all sources" tab is selected. Therefore, an associated graph of accesses over time can display access data relating to all or substantially all classes within the time period selected. The tabs can also provide a class-oriented count or other statistics 118. In this case, the aggregate number of views from all sources over the selected time period is 36,455. 33,212 of these views are from internal domain views (e.g., internal referrer class $114_1$), which is summarized by the "Internal domain views" tab as well as graphically depicted over time by the chart. Similarly, 121 views occurred from external sources, and 3,122 views occurred from viral sources. Subclasses for any of the primary classes can be grouped under the parent class or depicted independently. As such, the user can quickly determine which referrers were most important in driving traffic to his or her video during that time period, or other relevant details.

Figure 5B:
Figure 5C:
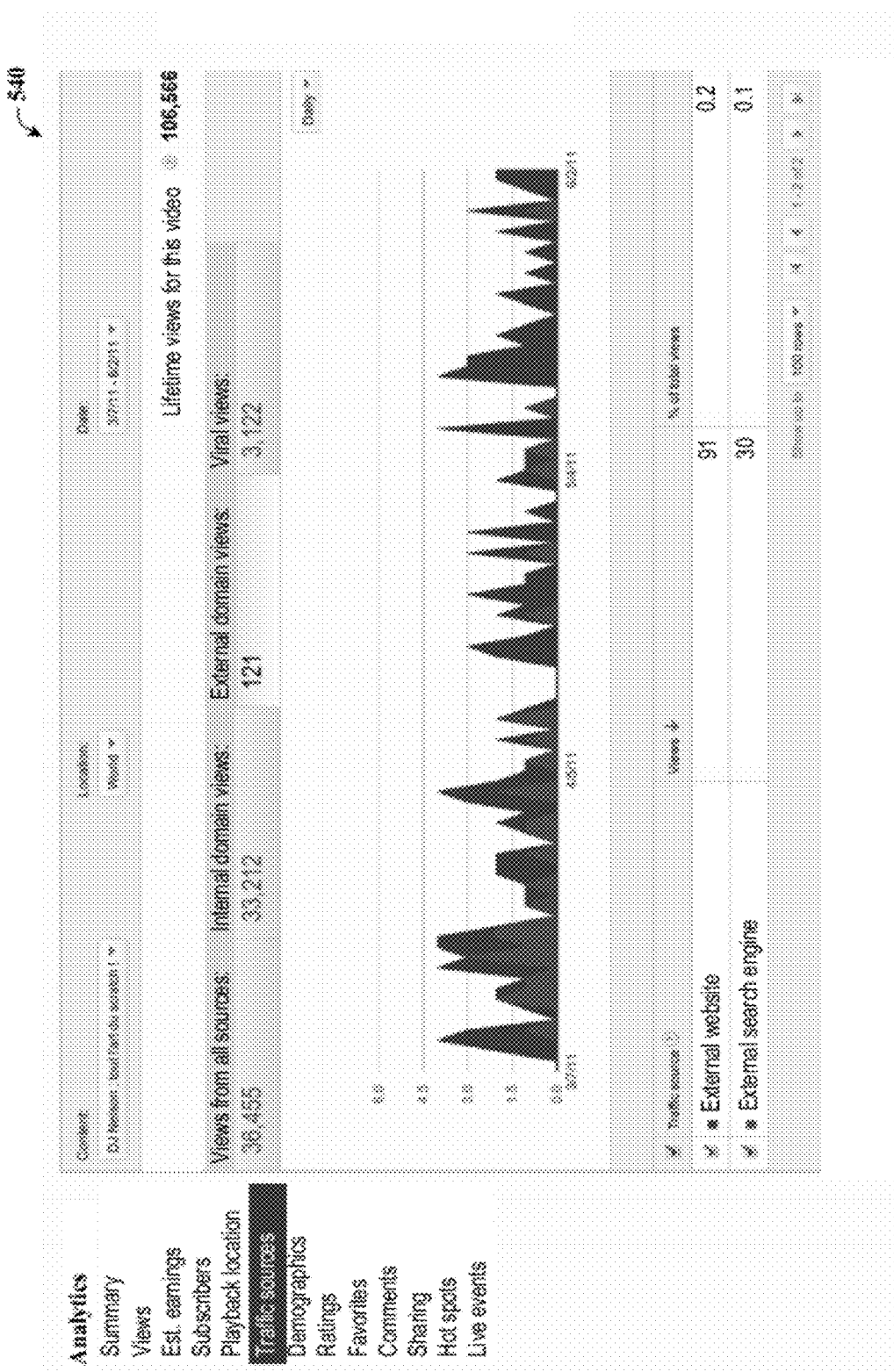
Figure 5D:
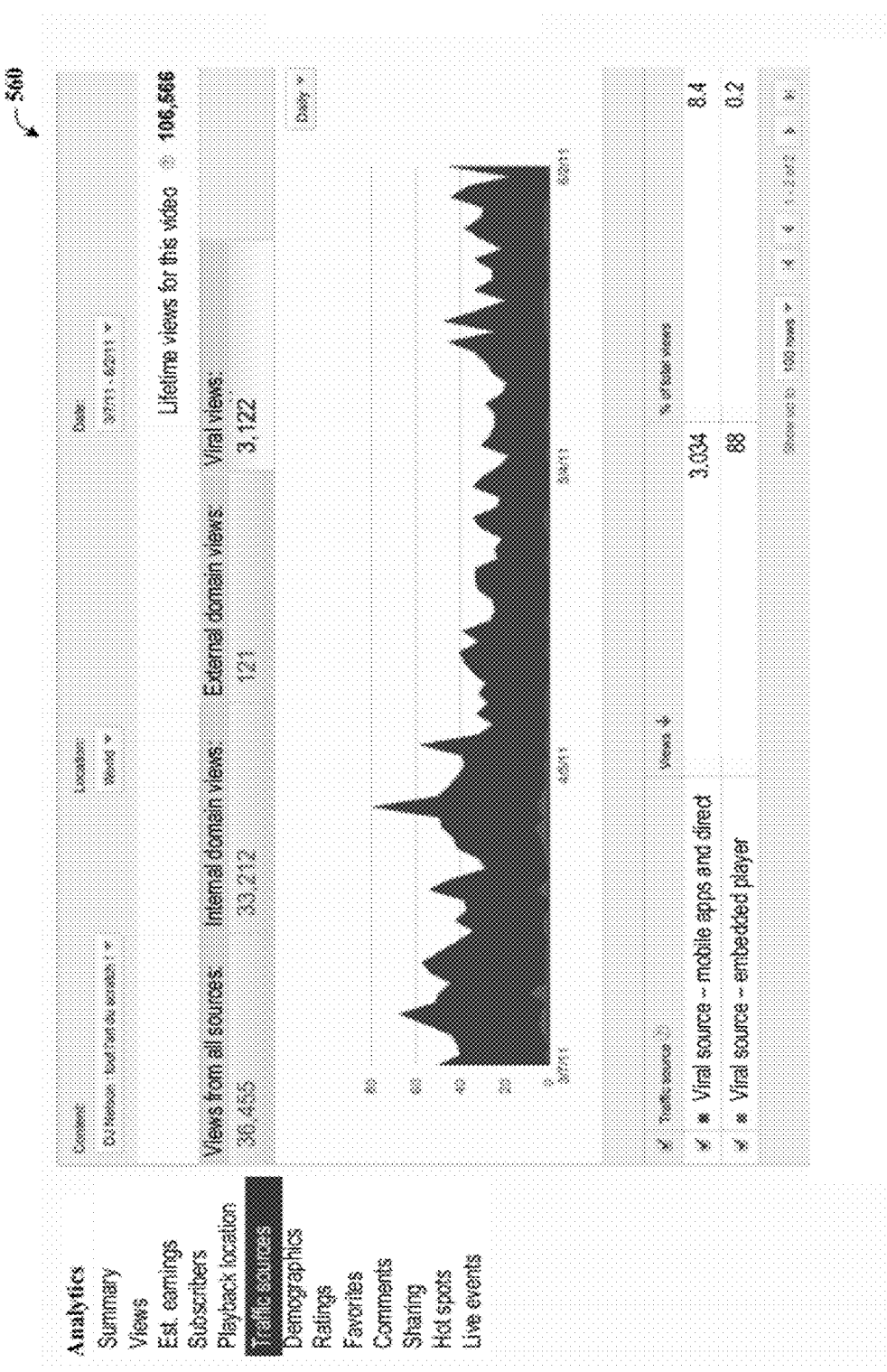

FIGS. 5B, 5C, and 5D depict example presentations 520, 540, and 560, respectively. Example presentations 520, 540, and 560 illustrate additional example views of statistics 118. In these example views, drill-down into a single class of referrers can be provided. For instance, example presentation 520 focuses on information relating to referrers 104 classified as internal referrer class $114_1$. Example presentation 540 focuses on information relating to referrers 104 classified as external referrer class $114_2$. Example presentation 560 focuses on information relating to referrers 104 classified as viral referrer class $114_3$. It is understood that other views can be provided associated with subclasses of one or more of the members of set of predefined classes 114. Additionally or alternatively, various subclasses or parent classes can be toggled on or off, with the associated portions of the graph updated in response.

Example Client-Side Embodiment

Figure 6:
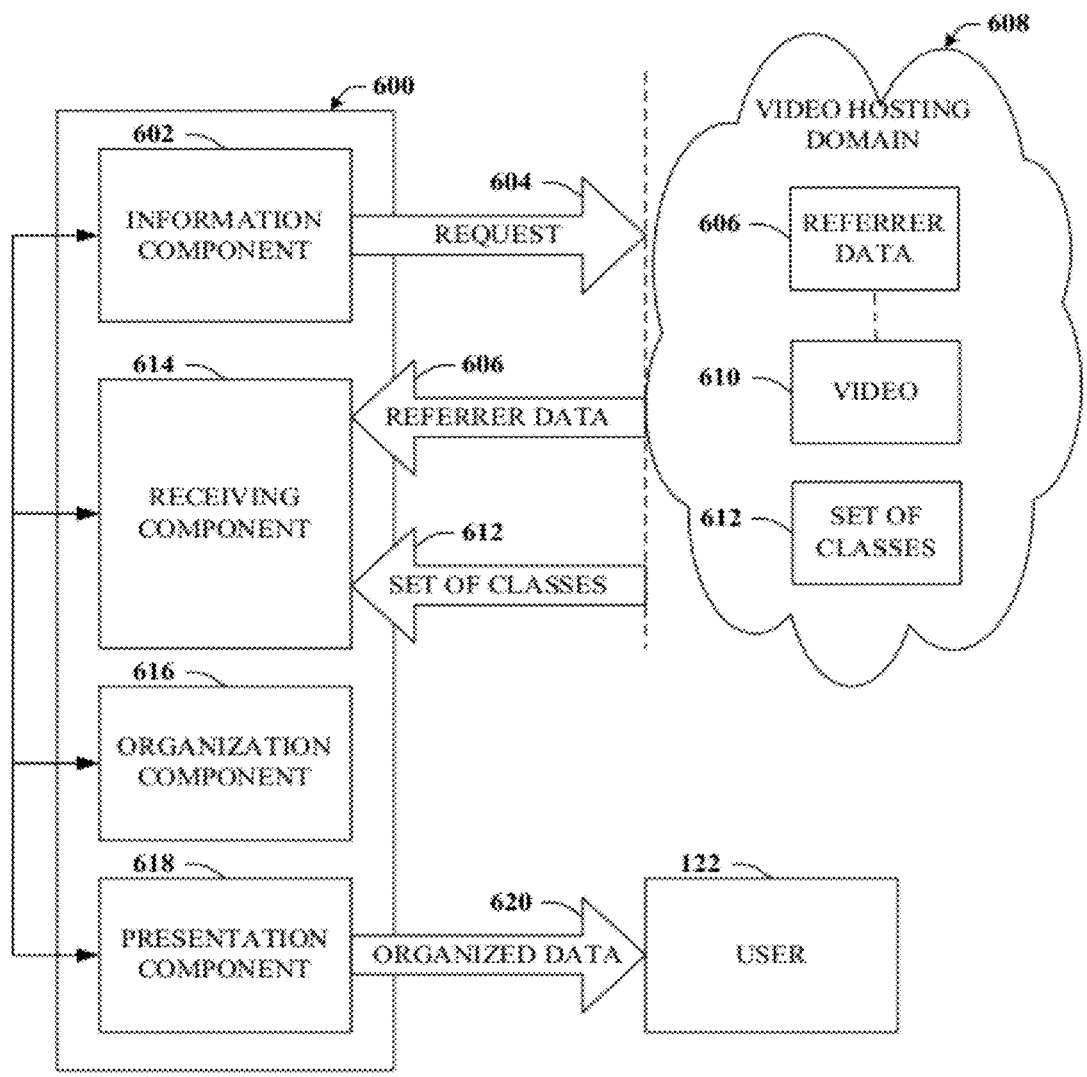
FIG. 6 illustrates a high-level functional block diagram of an example client system that can present access or consumption statistics in accordance with an implementation of this disclosure.

Referring now to FIG. 6, system 600 is depicted. System 600 relates to an embodiment that can present access or consumption statistics. Generally, system 600 can include information component 102 that can be configured to request (e.g., via request 604) referrer data 606 associated with a video available for access on video hosting domain 608. Video hosting domain 608 can be, e.g., a video content website that hosts videos (e.g., video 610) for users, which can be accessed by other users of video hosting domain 608. Referrer data 606 can relate to access or usage statistics associated with video 610. Such statistics can be logged and stored for later access or recall, for example by identification component 102 of FIG. 1, or a similar component of video hosting domain 608. Further, video hosting domain 608 can maintain a set of classes 612 into which video access data is categorized such as that described in connection with classification component 110 and/or set of predefined classes 114.

System 600 can also include receiving component 614 that can be configured to receive referrer data 606 and set of classes 612 from video hosting domain 608 or a component thereof (e.g., statistics component 116). Set of classes 612 can include an internal referrer class, an external referrer class, and a viral referrer class as well as information that associate referrer data 606 with one or more classes included in set of classes 612. System 600 can further include organization component 616 that can be configured to organize referrer data 606 into suitable classes included in set of classes 612.

For example, in one implementation, referrer data 606 can be received by receiving component 614 as raw (e.g., unorganized) data in which case organization component 616 can appropriately classify the data according to criteria for set of classes 612. In another implementation, referrer data 606 can be received already organized according to set of classes 612 (e.g., at video hosting domain prior to transmission to receiving component 614). In this case, organization component 616 can filter referrer data 606 according to input requested by user 122. For instance, if user 122 is interested in a view of referrer data 106 pertaining only to viral referrer class, organization component 616 can filter other data appropriately.

System 600 can include presentation component 618 that can be configured to present a view of statistical data associated with referrer data 606. The statistical data can relate to, for example, a number of accesses of video 610 by a particular class of referrer. Hence, presentation component 620 can provide user 122 an aggregate view of all or a portion of referrer data 606 that is organized according to class (e.g., organized data 620) or a filtered subset that is organized according to one or more classes. For example, organized data 620 can represent a class view of referrer data 606 that depicts all or a portion of referrer data 606 associated with one or more classes included in set of classes 612. Additionally or alternatively, organized data 620 can represent a subclass view of referrer data 606 that depicts all or a portion of referrer data 606 associated with one or more subclass of the one or more classes.

It is understood that all or portions of system 600 can be included in a client device (e.g., a laptop, smart phones, personal digital assistant, media player, computer, portable electronic device, tablet, etc.) or a client application (e.g., a browser, media player or decoder, etc.). Additionally, in certain implementations, request 604 can be for a subset of the referrer data 606 (e.g., a subset associated with a particular class/subclass or a group of classes/subclasses) such that the receiving component 614 receives a subset of the referrer data 606 (e.g., the subset of data associated with that particular class).

Figure 7:
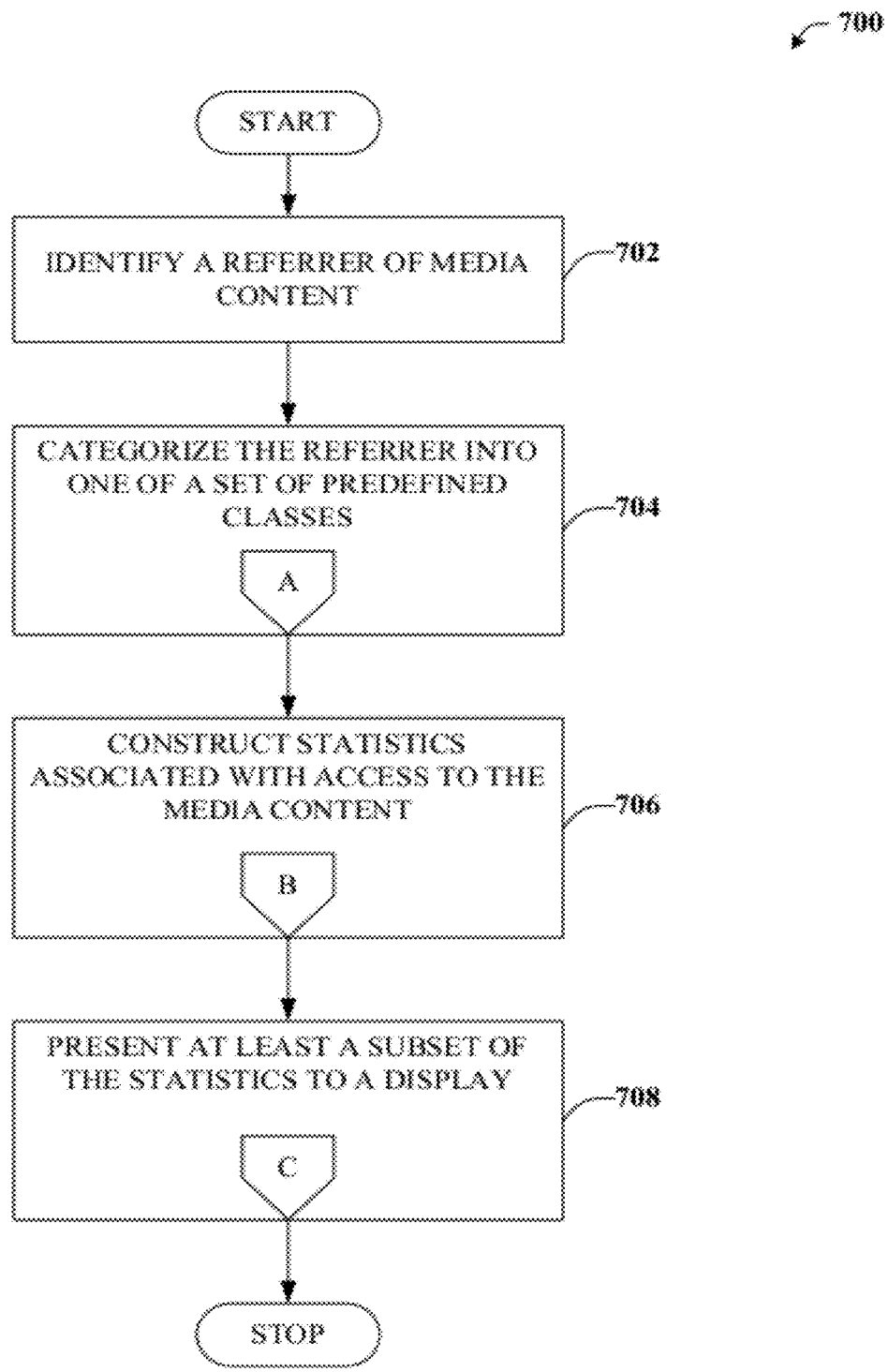
FIG. 7 illustrates an example methodology for presenting content consumption statistics in accordance with an implementation of this disclosure.

Referring now to FIG. 7, exemplary method 700 for presenting content consumption statistics is depicted. Generally, at reference numeral 702, a referrer of media content is identified (e.g., by an identification component). The referrer can be a source of a link or other reference, such as a web page with a hypertext link to the media content. This referrer can be identified in response to the link being utilized to access the media content (e.g., a video uploaded to a content hosting domain or web site, an image, an audio, etc.).

At reference numeral 704 the referrer is categorized (e.g., by a classification component) into one of a set of predefined classes based upon a location of the referrer, a type of the referrer, or other characteristics associated with the referrer. For instance, the referrer can be categorized as an internal referrer class, an external referrer class, a viral referrer class, or as another referrer class included in the set of predefined classes.

At reference numeral 706, statistics associated with access to the media content can be constructed (e.g., by a statistics component) for at least one class included in the set of predefined classes. At reference numeral 708, at least a subset of the statistics constructed in connection with reference numeral 706 can be presented (e.g., by a presentation component) to a computer-based display (or other presentation device) that is configured for presenting the statistics.

Figure 8:
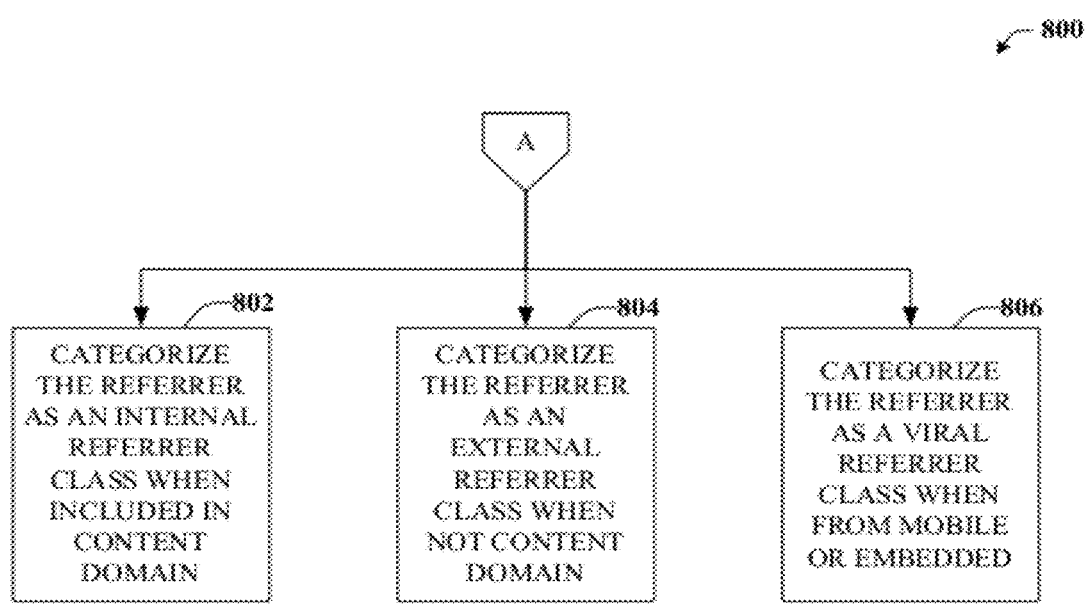
FIG. 8 illustrates an example methodology for categorizing the referrer in accordance with an implementation of this disclosure.

Turning now to FIG. 8, example method 800 is illustrated. Method 800 provides various non-limiting examples for categorizing the referrer, e.g., may be used at reference numeral 704 in FIG. 7. At reference numeral 802, the referrer can be categorized into an internal referrer class in response to a source of a reference link utilized to access the media content being included in a content domain associated with the media content. For example, if the media content is hosted by a content hosting web site and the referrer exists at a different location within the content hosting web site, then the internal referrer class can be selected as the appropriate class in which to categorize the referrer. Such internal referrers can originate from, e.g., advertising or promotion, annotation or comments, subscription requests, channel data, domain search results, etc.

At reference numeral 804, the referrer can be categorized into an external referrer class in response to a source of a reference link utilized to access the media content being external to the content domain associated with the media content. External referrers can arise as a result of, for example, an external search results page or another external web page that points to the media content e.g., a feed or stream of a social networking application. At reference numeral 806, the referrer can be categorized into a viral referrer class in response to a source of a reference link utilized to access the media content being included in an embedded content presenter (e.g., a content player embedded in and/or accessible from a website or social networking application) or a mobile application, for example.

Figure 9:
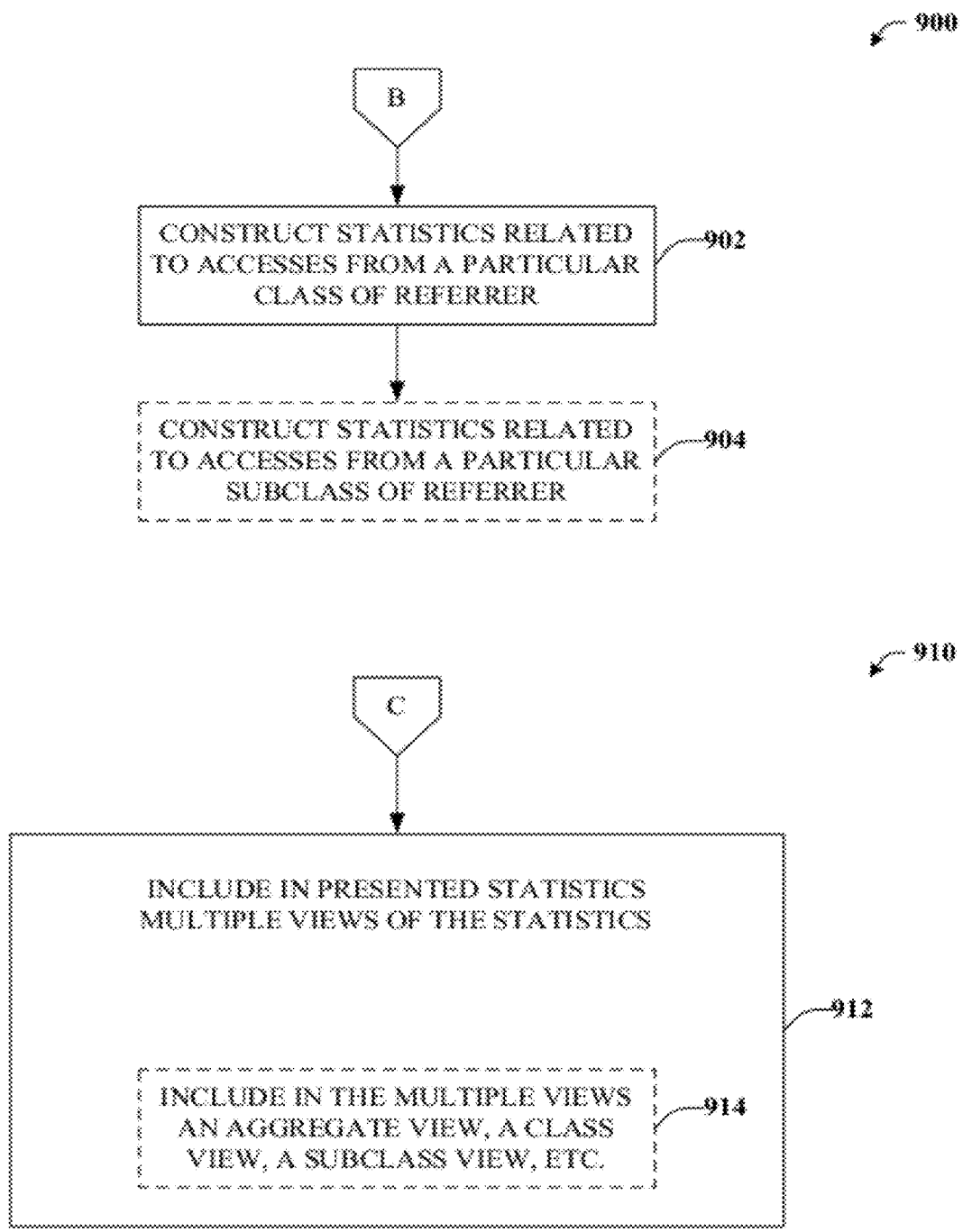
FIG. 9 illustrates an example methodology for constructing the statistics in accordance with an implementation of this disclosure.

Referring to FIG. 9, example methods 900 and 910 are depicted. Method 900 provides additional non-limiting features or aspects in connection with constructing the statistics, e.g., may be employed at reference numeral 706 in FIG. 7. At reference numeral 902, statistics related to accesses to the media content from a particular class from the set of predefined classes is constructed. For example, the statistics can identify the number of accesses and/or referrers that belong to each class or the accesses from referrers associated with a particular class.

At reference numeral 904, statistics related to accesses to the media content from a subclass of one or more class is constructed. As noted, some classes can have subclasses. For example, the internal referrer class can include subclasses such as subclasses relating to advertising, annotation, internal searches, etc. Likewise, the external referrer class and the viral referrer class can also include suitable subclasses, and statistics for these subclasses can be organized according to the identified class/subclass.

Method 910 provides additional non-limiting features or aspects in connection with presenting at least a subset of the statistics, e.g., may be employed at reference numeral 708 in FIG. 7. At reference numeral 912, multiple views of the statistics are included in the presentation. Reference numeral 914 provides an example embodiment of the multiple views, wherein the multiple views includes at least one of an aggregate view of the statistics (e.g., all or a substantial portion of the various classes being represented), a class-specific view of the statistics (e.g., one or a small subset of classes potentially including associated subclasses), or a subclass-specific view of the statistics (e.g., all or a portion of subclasses associated with a particular class).

Example Operating Environments

The systems and processes described above can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders, not all of which may be explicitly illustrated herein.

Figure 10:
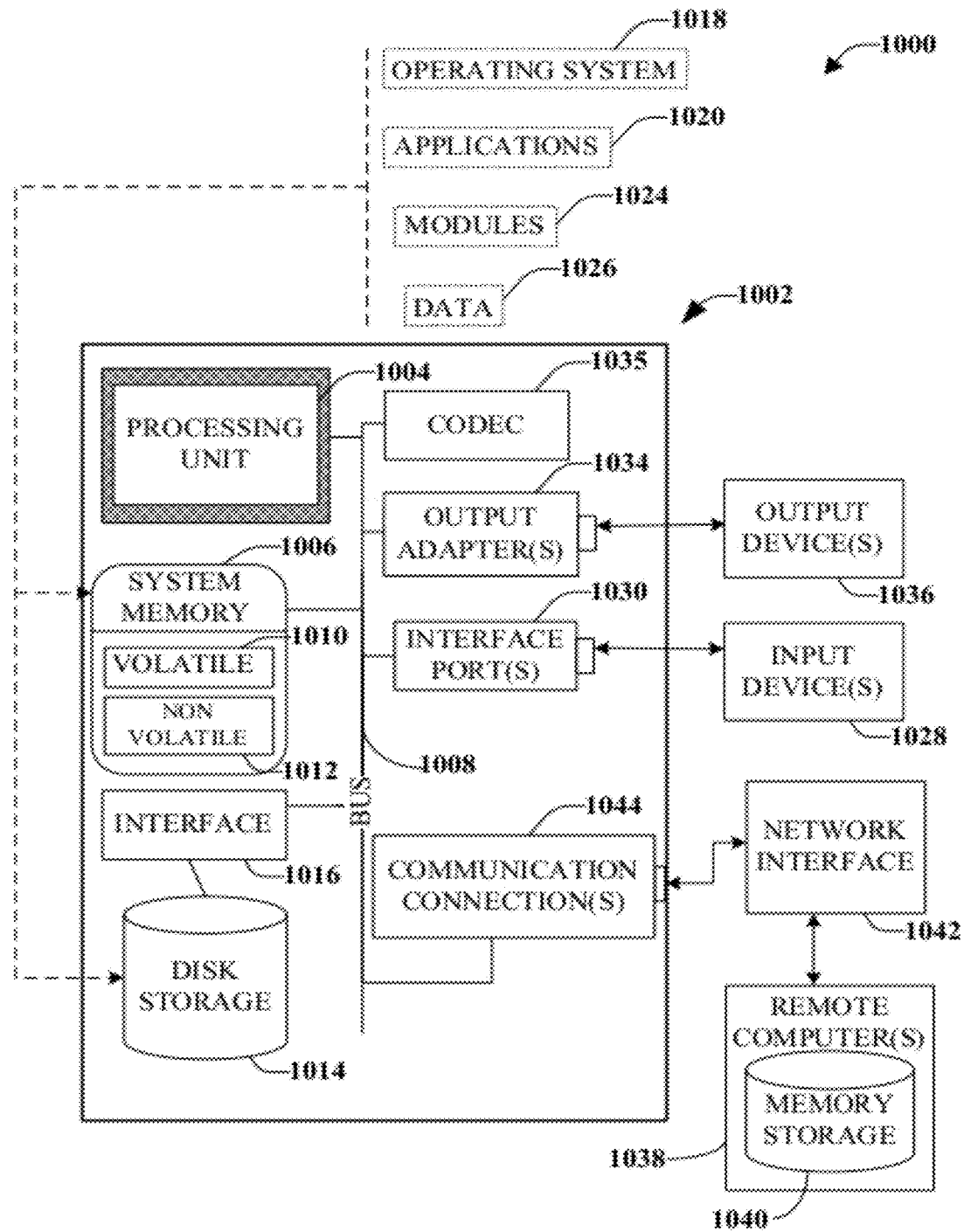
FIG. 10 illustrates an example block diagram for a suitable computing environment for implementing various aspects of the disclosed subject matter.

With reference to FIG. 10, a suitable environment 1000 for implementing various aspects of the claimed subject matter includes a computer 1002. The computer 1002 includes a processing unit 1004, a system memory 1006, a codec 1005, and a system bus 1008. The system bus 1008 couples system components including, but not limited to, the system memory 1006 to the processing unit 1004. The processing unit 1004 can be any of various available processors. Dual microprocessors and other multiprocessor architectures also can be employed as the processing unit 1004.

The system bus 1008 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 1394), and Small Computer Systems Interface (SCSI).

The system memory 1006 includes volatile memory 1010 and non-volatile memory 1012. The basic input/output system (BIOS), containing the basic routines to transfer information between elements within the computer 1002, such as during start-up, is stored in non-volatile memory 1012. In addition, according to present innovations, codec 1035 may include at least one of an encoder or decoder, wherein the at least one of an encoder or decoder may consist of hardware, a combination of hardware and software, or software. Although, codec 1035 is depicted as a separate component, codec 1035 may be contained within non-volatile memory 1012. By way of illustration, and not limitation, non-volatile memory 1012 can include read only memory (ROM), programmable ROM (PROM), electrically programmable ROM (EPROM), electrically erasable programmable ROM (EEPROM), or flash memory. Volatile memory 1010 includes random access memory (RAM), which acts as external cache memory. According to present aspects, the volatile memory may store the write operation retry logic (not shown in FIG. 10) and the like. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM.

Computer 1002 may also include removable/non-removable, volatile/non-volatile computer storage medium. FIG. 10 illustrates, for example, disk storage 1014. Disk storage 1014 includes, but is not limited to, devices like a magnetic disk drive, solid state disk (SSD) floppy disk drive, tape drive, Jaz drive, Zip drive, LS-100 drive, flash memory card, or memory stick. In addition, disk storage 1014 can include storage medium separately or in combination with other storage medium including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1014 to the system bus 1008, a removable or non-removable interface is typically used, such as interface 1016.

It is to be appreciated that FIG. 10 describes software that acts as an intermediary between users and the basic computer resources described in the suitable operating environment 1000. Such software includes an operating system 1018. Operating system 1018, which can be stored on disk storage 1014, acts to control and allocate resources of the computer system 1002. Applications 1020 take advantage of the management of resources by operating system 1018 through program modules 1024, and program data 1026, such as the boot/shutdown transaction table and the like, stored either in system memory 1006 or on disk storage 1014. It is to be appreciated that the claimed subject matter can be implemented with various operating systems or combinations of operating systems.

A user enters commands or information into the computer 1002 through input device(s) 1028. Input devices 1028 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1004 through the system bus 1008 via interface port(s) 1030. Interface port(s) 1030 include, for example, a serial port, a parallel port, a game port, and a universal serial bus (USB). Output device(s) 1036 use some of the same type of ports as input device(s) 1028. Thus, for example, a USB port may be used to provide input to computer 1002 and to output information from computer 1002 to an output device 1036. Output adapter 1034 is provided to illustrate that there are some output devices 1036 like monitors, speakers, and printers, among other output devices 1036, which require special adapters. The output adapters 1034 include, by way of illustration and not limitation, video and sound cards that provide a means of connection between the output device 1036 and the system bus 1008. It should be noted that other devices and/or systems of devices provide both input and output capabilities such as remote computer(s) 1038.

Computer 1002 can operate in a networked environment using logical connections to one or more remote computers, such as remote computer(s) 1038. The remote computer(s) 1038 can be a personal computer, a server, a router, a network PC, a workstation, a microprocessor based appliance, a peer device, a smart phone, a tablet, or other network node, and typically includes many of the elements described relative to computer 1002. For purposes of brevity, only a memory storage device 1040 is illustrated with remote computer(s) 1038. Remote computer(s) 1038 is logically connected to computer 1002 through a network interface 1042 and then connected via communication connection(s) 1044. Network interface 1042 encompasses wire and/or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1044 refers to the hardware/software employed to connect the network interface 1042 to the bus 1008. While communication connection 1044 is shown for illustrative clarity inside computer 1002, it can also be external to computer 1002. The hardware/software necessary for connection to the network interface 1042 includes, for exemplary purposes only, internal and external technologies such as, modems including regular telephone grade modems, cable modems and DSL modems, ISDN adapters, and wired and wireless Ethernet cards, hubs, and routers.

Figure 11:
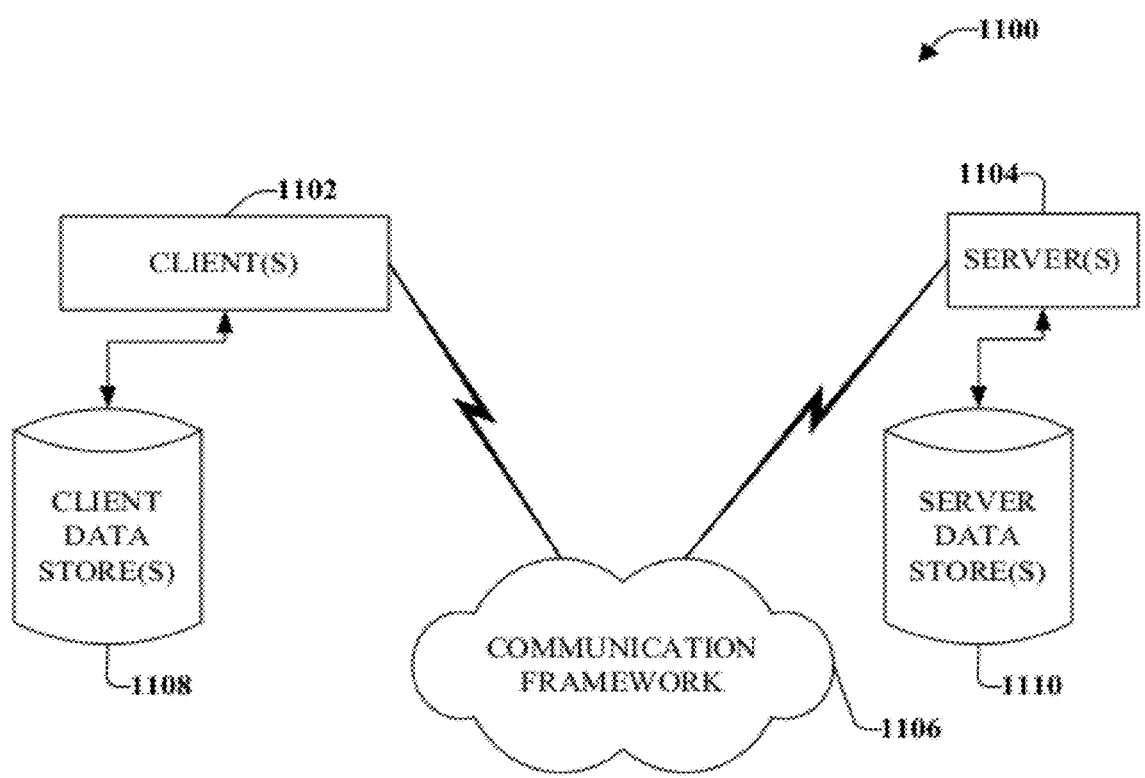
FIG. 11 illustrates an example schematic block diagram of a computing environment operable to execute the disclosed subject matter.

Referring now to FIG. 11, there is illustrated a schematic block diagram of a computing environment 1100 in accordance with this specification. The system 1100 includes one or more client(s) 1102 (e.g., laptops, smart phones, PDAs, media players, computers, portable electronic devices, tablets, and the like). The client(s) 1102 can be hardware and/or software (e.g., threads, processes, computing devices). The system 1100 also includes one or more server(s) 1104. The server(s) 1104 can also be hardware or hardware in combination with software (e.g., threads, processes, computing devices). The servers 1104 can house threads to perform transformations by employing aspects of this disclosure, for example. One possible communication between a client 1102 and a server 1104 can be in the form of a data packet transmitted between two or more computer processes wherein the data packet may include video data. The data packet can include a cookie and/or associated contextual information, for example. The system 1100 includes a communication framework 1106 (e.g., a global communication network such as the Internet, or mobile network(s)) that can be employed to facilitate communications between the client(s) 1102 and the server(s) 1104.

Communications can be facilitated via a wired (including optical fiber) and/or wireless technology. The client(s) 1102 are operatively connected to one or more client data store(s) 1108 that can be employed to store information local to the client(s) 1102 (e.g., cookie(s) and/or associated contextual information). Similarly, the server(s) 1104 are operatively connected to one or more server data store(s) 1110 that can be employed to store information local to the servers 1104.

In one embodiment, a client 1102 can transfer an encoded file, in accordance with the disclosed subject matter, to server 1104. Server 1104 can store the file, decode the file, or transmit the file to another client 1102. It is to be appreciated, that a client 1102 can also transfer uncompressed file to a server 1104 and server 1104 can compress the file in accordance with the disclosed subject matter. Likewise, server 1104 can encode video information and transmit the information via communication framework 1106 to one or more clients 1102.

The illustrated aspects of the disclosure may also be practiced in distributed computing environments where certain tasks are performed by remote processing devices that are linked through a communications network. In a distributed computing environment, program modules can be located in both local and remote memory storage devices.

Moreover, it is to be appreciated that various components described herein can include electrical circuit(s) that can include components and circuitry elements of suitable value in order to implement the embodiments of the subject innovation(s). Furthermore, it can be appreciated that many of the various components can be implemented on one or more integrated circuit (IC) chips. For example, in one embodiment, a set of components can be implemented in a single IC chip. In other embodiments, one or more of respective components are fabricated or implemented on separate IC chips.

What has been described above includes examples of the embodiments of the present invention. It is, of course, not possible to describe every conceivable combination of components or methodologies for purposes of describing the claimed subject matter, but it is to be appreciated that many further combinations and permutations of the subject innovation are possible. Accordingly, the claimed subject matter is intended to embrace all such alterations, modifications, and variations that fall within the spirit and scope of the appended claims. Moreover, the above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable storage medium having computer-executable instructions for performing the acts and/or events of the various methods of the claimed subject matter.

The aforementioned systems/circuits/modules have been described with respect to interaction between several components/blocks. It can be appreciated that such systems/circuits and components/blocks can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables the hardware to perform specific function; software stored on a computer readable medium; or a combination thereof.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Computing devices typically include a variety of media, which can include computer-readable storage media and/or communications media, in which these two terms are used herein differently from one another as follows. Computer-readable storage media can be any available storage media that can be accessed by the computer, is typically of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal that can be transitory such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

In view of the exemplary systems described above, methodologies that may be implemented in accordance with the described subject matter will be better appreciated with reference to the flowcharts of the various figures. For simplicity of explanation, the methodologies are depicted and described as a series of acts. However, acts in accordance with this disclosure can occur in various orders and/or concurrently, and with other acts not presented and described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be appreciated that the methodologies disclosed in this specification are capable of being stored on an article of manufacture to facilitate transporting and transferring such methodologies to computing devices. The term article of manufacture, as used herein, is intended to encompass a computer program accessible from any computer-readable device or storage media.

What is claimed is:

1. A content access analytics system, comprising:
   a memory that stores computer executable components; and
   a microprocessor that executes the following computer executable components stored in the memory:
   an identification component configured to identify a referrer of media content;
   a classification component configured to classify the referrer into one of a set of predefined classes, wherein the set of predefined classes includes: (1) an internal referrer class, (2) an external referrer class, and (3) a viral referrer class, wherein the classification component classifies the referrer into the internal referrer class in response to the referrer being in a content domain associated with the media content, or classifies the referrer into the external referrer class in response to the referrer being external to the content domain associated with the media content; and
   a statistics component configured to generate statistics associated with access to the media content for at least one class included in the set of predefined classes.

2. The system of claim 1, wherein the media content is a video uploaded to a third party video content domain by a user associated with the video.

3. The system of claim 1, wherein the referrer relates to a source or a location of a reference link utilized to access the media content.

4. The system of claim 1, wherein the referrer is associated with at least one of content domain advertising, a content domain annotation, a content domain channel, a content domain promotion, a content domain subscription, or a content domain search.

5. The system of claim 1, wherein the referrer is associated with an external web site or web address or associated with results of a search query from an external search.

6. The system of claim 1, wherein the classification component classifies the referrer into the viral referrer class in response to the referrer being unknown.

7. The system of claim 6, wherein the referrer is associated with an embedded content presenter or a mobile access.

8. The system of claim 1, wherein the classification component classifies the referrer into the viral referrer class in response to the referrer being associated with an embedded content presenter or a mobile access.

9. The system of claim 1, wherein the statistics component generates statistics regarding number of accesses of the media content relating a particular class from the set of predefined classes.

10. The system of claim 9, wherein the statistics component generates statistics regarding number of accesses of the media content relating to a subclass of the particular class.

11. The system of claim 1, further comprising a presentation component configured to present the statistics.

12. The system of claim 11, wherein the presentation component presents multiple views of the statistics.

13. The system of claim 12, wherein the multiple views include an aggregate view of the statistics, a class-specific view of the statistics, or a subclass-specific view of the statistics.

14. A method for presenting content consumption statistics, comprising:
employing a computer-based processor to execute computer executable components stored within a memory to perform the following:
identifying a referrer of media content;
categorizing the referrer into one of a set of predefined classes, wherein the predefined classes includes: an internal referrer class, an external referrer class, and a viral referrer class, wherein the referrer is categorized into the internal referrer class in response to a source of a reference link utilized to access the media content being included in a content domain associated with the media content, or categorized into the external referrer class in response to a source of a reference link utilized to access the media content being external to the content domain associated with the media content;
constructing statistics associated with access to the media content for at least one class included in the set of predefined classes; and
transmitting at least a subset of the statistics to a computer-based display configured for presenting the subset of the statistics.

15. The method of claim 14, wherein the referrer is categorized into the viral referrer class in response to a source of a reference link utilized to access the media content being included in an embedded content presenter or a mobile application.

16. The method of claim 14, wherein the statistics relates to a number of accesses to the media content originating from a particular class from the set of predefined classes.

17. The method of claim 16, wherein the statistics relates to a number of accesses to the media content originating from a subclass of the particular class.

18. The method of claim 14, wherein the at least a subset of statistics presented includes multiple views of the statistics.

19. The method of claim 18, wherein the multiple views includes at least one of an aggregate view of the statistics, a class-specific view of the statistics, or a subclass-specific view of the statistics.

20. An apparatus comprising a non-transitory computer readable storage medium encoding the following computer executable components:
an information component configured to request referrer data associated with a video available for access on a video hosting domain;
a receiving component configured to receive the referrer data and a set of predefined classes including at least an internal referrer class, an external referrer class, and a viral referrer class, wherein the referrer data is classified into the internal referrer class in response to the referrer data being in a content domain associated with the media content, or classified into the external referrer class in response to the referrer data being external to the content domain associated with the media content;
an organization component configured to organize the referrer data according to the predefined classes; and
a presentation component configured to present a view of statistical data associated with the referrer data.

21. The apparatus of claim 20, wherein the view of statistical data includes an aggregate view of all or a portion of the referrer data.

22. The apparatus of claim 20, wherein the view of statistical data includes a class view of the referrer data, wherein the class view depicts all or a portion of referrer data associated with one or more class included in the predefined classes.

23. The apparatus of claim 20, wherein the view of statistical data includes a subclass view of the referrer data, wherein the subclass view depicts all or a portion of referrer data associated with one or more subclass of at least one class included in the predefined classes.

* * * * *